(12) United States Patent
Zhang et al.

(10) Patent No.: US 11,859,974 B2
(45) Date of Patent: Jan. 2, 2024

(54) UNMANNED SYSTEM AND METHOD FOR MONITORING LATERAL DEFORMATION OF LANDSLIDE BASED ON INERTIAL MEASUREMENT

(71) Applicant: CHINA UNIVERSITY OF GEOSCIENCES (WUHAN), Wuhan (CN)

(72) Inventors: Yongquan Zhang, Wuhan (CN); Huiming Tang, Wuhan (CN); Junrong Zhang, Wuhan (CN); Guiying Lu, Wuhan (CN); Changdong Li, Wuhan (CN); Qianyun Wang, Wuhan (CN); Chengyuan Lin, Wuhan (CN)

(73) Assignee: CHINA UNIVERSITY OF GEOSCIENCES (WUHAN), Wuhan (CN)

( * ) Notice: Subject to any disclaimer, the term of this patent is extended or adjusted under 35 U.S.C. 154(b) by 316 days.

(21) Appl. No.: 17/336,327

(22) Filed: Jun. 2, 2021

(65) Prior Publication Data
US 2022/0316877 A1 Oct. 6, 2022

(30) Foreign Application Priority Data
Mar. 30, 2021 (CN) .......................... 202110338044.5

(51) Int. Cl.
*G01C 15/00* (2006.01)
*G01B 5/20* (2006.01)
*G01S 19/01* (2010.01)

(52) U.S. Cl.
CPC ............... *G01C 15/00* (2013.01); *G01B 5/20* (2013.01); *G01S 19/01* (2013.01)

(58) Field of Classification Search
None
See application file for complete search history.

(56) References Cited

U.S. PATENT DOCUMENTS

| 8,873,337 B2 | 10/2014 | Rikoski |
| 9,103,938 B2 | 8/2015 | Rikoski |
| 11,016,185 B1 * | 5/2021 | Rikoski ............... G01S 15/003 |

* cited by examiner

*Primary Examiner* — Jermele M Hollington
*Assistant Examiner* — Carl F. R. Tchatchouang
(74) *Attorney, Agent, or Firm* — True Shepherd LLC; Andrew C. Cheng

(57) ABSTRACT

In an unmanned system for monitoring lateral deformation of a landslide based on inertial measurement, a deformable coupling pipeline is disposed in a landslide mass. An unmanned trajectory tracer is provided with a battery, a motor wheel, an inertial sensor, and a single chip microcomputer that are electrically connected. The single chip microcomputer controls the motor wheel to drive the unmanned trajectory tracer to move back and forth in the deformable coupling pipeline. The single chip microcomputer controls the inertial sensor to measure a shape of the deformable coupling pipeline. Two monitoring piers are disposed at two ends of the deformable coupling pipeline respectively. The monitoring pier is provided with a GPS device and a communication device, the communication device is in communication connection with the single chip microcomputer, and the single chip microcomputer obtains the shape of the deformable coupling pipeline and sends to the communication device.

10 Claims, 5 Drawing Sheets

UNMANNED SYSTEM AND METHOD FOR MONITORING LATERAL DEFORMATION OF LANDSLIDE BASED ON INERTIAL MEASUREMENT

CROSS-REFERENCE TO RELATED APPLICATIONS

This application claims priority to Chinese Patent Application No. 202110338044.5 with a filing date of Mar. 30, 2021. The content of the aforementioned applications, including any intervening amendments thereto, are incorporated herein by reference.

TECHNICAL FIELD

The present disclosure relates to the technical field of monitoring of landslide deformation, and in particular, to an unmanned system and method for monitoring lateral deformation of a landslide based on inertial measurement.

BACKGROUND

As a common geological disaster in the world, the landslide is listed as one of important research content of International Decade for Natural Disaster Reduction (IDNDR) by the United Nations. The landslide disaster is unexpected and has enormous destructive power. Therefore, the safety of people's life and property in the landslide region is often seriously threatened. An effective method for controlling the landslide disaster is to perform continuous monitoring to obtain deformation characteristics of the landslide, and perform prediction and treatment based on the deformation characteristics.

Monitoring of a landslide displacement field includes surface displacement monitoring and deep displacement monitoring. Methods for measuring a relative surface displacement of the landslide include a mechanical measurement method, an extensometer measurement method, a total station measurement method, a digital close-range photography method, a laser displacement method, and a laser fiber measurement method. Methods for measuring an absolute surface displacement of the landslide include a global positioning system (GPS) measurement method, a lidar measurement method, a synthetic aperture interferometer method, and the like. A borehole inclination measurement method is mainly used in deep displacement monitoring. The mechanical measurement method is applicable to group measurement and prevention, with low precision and little information. A landslide early-warning extensometer is applicable to single-crack monitoring, with high measurement precision and little measurement data, and requiring professional maintenance. Digital close-range photography can carry out dynamic and three-dimensional (3D) measurement with a large amount of information, but is affected by vegetation on the landslide. Laser displacement measurement requires a reference platform and has high precision, but is easily affected by an environment. As a relatively new measurement method, fiber grating embedded measurement has obvious advantages in measurement of rock mass micro-deformation, but it still needs to be improved. The GPS measurement method has high precision, but it can only be used to perform deformation monitoring of a single point on a ground surface, and cannot obtain continuous distribution data of underground local deformation and ground deformation. The lidar measurement method is applicable to fast data collection and analysis in a large region, but it needs to be based on an accurate DEM. The borehole inclination measurement method provides a precise measurement result, but the method still has a pipeline-soil coupling error, is time-consuming, and requires vertical displacement distribution for a measured object. Patents CN 107894239B and CN 101051089A provide an underground deformation measurement technology based on an inertial technique. This kind of technology can be applied to precise measurement of continuous displacement distribution in a horizontal direction at any depth of landslide mass space, to understand deformation characteristics of a landslide mass. However, this technology requires regular manual operations and charging, and is complicated for use. Therefore, it is necessary to provide an unmanned method for performing an arbitrary spatial layout in a landslide mass, and automatically and continuously obtaining data of horizontal displacement changes in the landslide mass, which is based on above technology and has great engineering significance and practical value for landslide engineering prevention, mechanism research, prediction, and the like.

SUMMARY

In view of this, to resolve the above problem, embodiments of the present disclosure provide an unmanned system and method for monitoring lateral deformation of a landslide based on inertial measurement.

An embodiment of the present disclosure provides an unmanned system for monitoring lateral deformation of a landslide based on inertial measurement, including:
  a deformable coupling pipeline, disposed in a landslide mass and at an upper part of a sliding surface;
  an unmanned trajectory tracer, disposed in the deformable coupling pipeline, where the unmanned trajectory tracer is provided with a battery, a plurality of motor wheels, an inertial sensor, and a single chip microcomputer that are electrically connected; the motor wheel is configured to make contact with an inner wall of the deformable coupling pipeline; when the motor wheel is powered on, the single chip microcomputer controls the motor wheel to rotate, to drive the unmanned trajectory tracer to move back and forth in the deformable coupling pipeline; and in a moving process of the unmanned trajectory tracer, the single chip microcomputer controls the inertial sensor to measure a shape of the deformable coupling pipeline; and
  two monitoring piers, securely connected to two ends of the deformable coupling pipeline respectively, where the monitoring pier is provided with a GPS device and a communication device, the GPS device is configured to obtain positions of the monitoring piers in real time, the communication device is in communication connection with the single chip microcomputer, the single chip microcomputer obtains the shape of the deformable coupling pipeline and sends it to the communication device, and the communication device is configured to upload the shape of the deformable coupling pipeline to a network or a mobile terminal.

Further, the monitoring pier is provided with a solar cell, the deformable coupling pipeline is wound with a wireless power transmitting coil, the solar cell is electrically connected to the wireless power transmitting coil, the unmanned trajectory tracer is wound with a wireless coupling coil, the wireless power transmitting coil is wirelessly coupled with the wireless coupling coil, and the battery is electrically connected to the wireless coupling coil.

Further, the deformable coupling pipeline is provided with a first near field communication (NFC) terminal, the unmanned trajectory tracer is provided with a second NFC terminal, the first NFC terminal is in communication connection with the second NFC terminal, the first NFC terminal is electrically connected to the communication device, and the second NFC terminal is electrically connected to the single chip microcomputer.

Further, the unmanned trajectory tracer includes a hollowed-out cavity, and the inertial sensor and the single chip microcomputer are secured in the cavity.

Further, the unmanned trajectory tracer further includes two connecting rods and support links, the two connecting rods extend along an extension direction of the deformable coupling pipeline, and are respectively secured at two ends of the cavity, the connecting rods each are connected to a plurality of support links, one end of each support link is securely connected to an end portion of the cavity, the other end of the support link is connected to an end, far away from the cavity, of the connecting rod, and the motor wheel is secured on each support link.

Further, the other end of the support link is slidably mounted on the connecting rod, and a spring is connected between the other end of the support link and the end, far away from the cavity, of the connecting rod.

Further, the two monitoring piers are secured on a solid ground surface.

Further, one monitoring pier is secured on a solid ground surface, and the other monitoring pier is secured on the landslide mass.

Further, the two monitoring piers are secured on the landslide mass.

An embodiment of the present disclosure further provides a monitoring method. Based on the above unmanned system for monitoring lateral deformation of a landslide based on inertial measurement, the monitoring method includes the following steps:

S1: determining a position of an initial measuring line of a landslide mass based on existing geological exploration data;

S2: disposing a deformable coupling pipeline in the landslide mass along a direction of the initial measuring line, and disposing an unmanned trajectory tracer at one end of the deformable coupling pipeline;

S3: building monitoring piers on two sides of the deformable coupling pipeline, and securely connecting the monitoring piers to two ends of the deformable coupling pipeline; and S4: driving, by rotation of a motor wheel, the unmanned trajectory tracer to move back and forth in the deformable coupling pipeline; controlling, by a single chip microcomputer, an inertial sensor and the motor wheel, to measure the disposed deformable coupling pipeline regularly; performing positioning by using a GPS device, and obtaining a shape of the deformable coupling pipeline by using the inertial sensor, to obtain a deformation measuring line of the deformable coupling pipeline; and using the initial measuring line of the deformable coupling pipeline as a zero displacement, and in a subsequent monitoring process, obtaining a displacement distribution curve, along a direction of the measuring line, of the landslide mass by subtracting a curve of the initial measuring line from each measured curve of the deformation measuring line.

The technical solutions provided in the embodiments of the present disclosure have the following beneficial effects: The system can work at any time any place under any weather condition. It has a mature technology and a reasonable design, and can be widely applied. It is applicable to monitoring of surface, underground and even underwater deformation of a landslide. The unmanned trajectory tracer has a high update rate of measurement data, and desired short-term precision and stability. The inertial sensor can provide data of a spatial position, a moving speed and direction, and a spatial posture of a monitored object, and generated measurement information has excellent continuity and low noise. With an unmanned design, the monitoring device is economically advantageous, and can be easily popularized.

Figure 1:
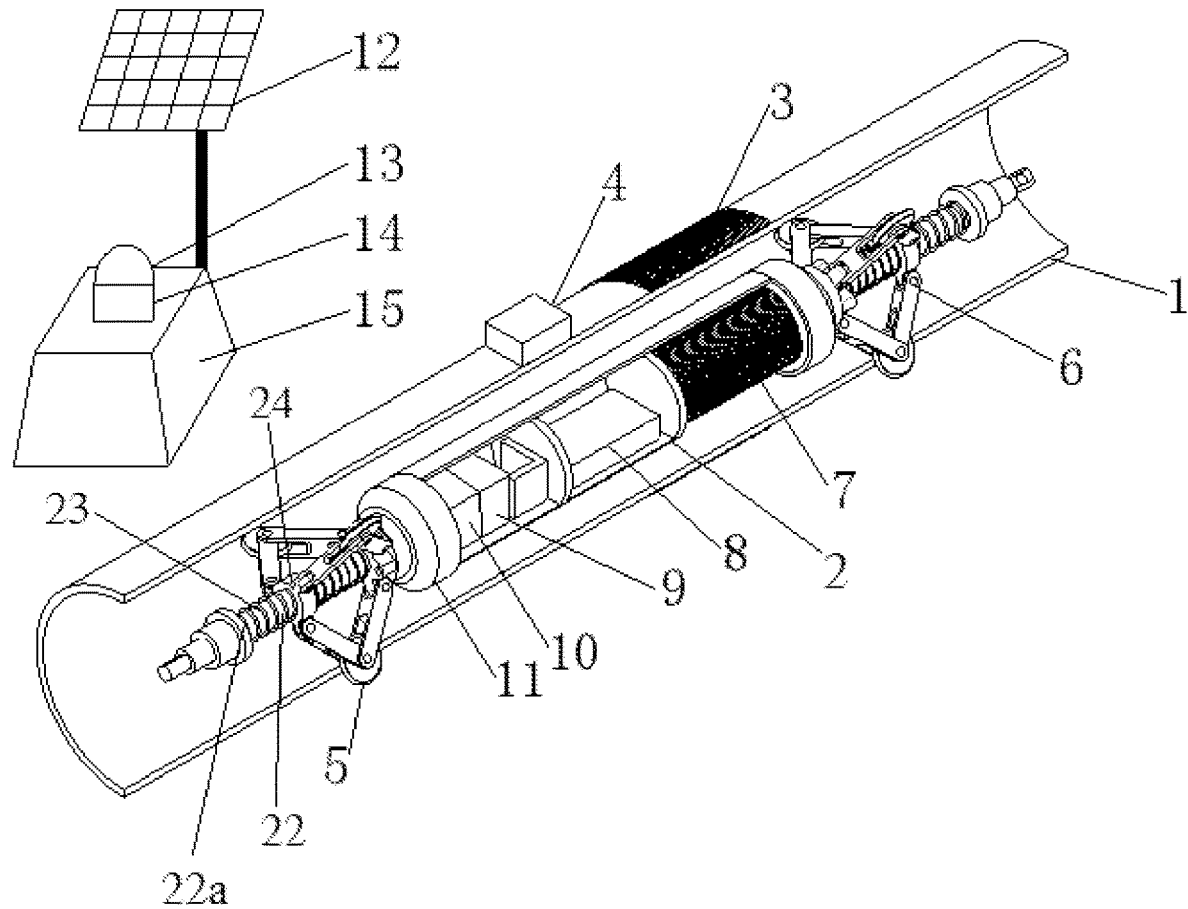
FIG. 1 is a schematic structural diagram of an embodiment of an unmanned system for monitoring lateral deformation of a landslide based on inertial measurement according to the present disclosure.

Reference numerals: 1: deformable coupling pipeline; 2 unmanned trajectory tracer; 3: wireless power transmitting coil; 4: first NFC terminal; 5: motor wheel; 6: support link; 7: wireless coupling coil; 8: second NFC terminal; 9: single chip microcomputer; 10: inertial sensor; 11: cavity; 12: solar cell; 13: GPS device; 14: control box; 15: monitoring pier; 16: simply-supported hinge type; 17: cantilever type; 18: floating hinge type; 19: landslide mass; 20: initial measuring line; 21: deformation measuring line; 22: connecting rod; 22a: ring-shaped protrusion portion; 23: spring; 24: lantern ring; and 25: battery.

DETAILED DESCRIPTION

In order to make the objectives, technical solutions, and advantages of the present disclosure clearer, the implementations of the present disclosure are described in more detail below with reference to the accompanying drawings.

Refer to FIG. 1 to FIG. 4. An embodiment of the present disclosure provides an unmanned system for monitoring lateral deformation of a landslide based on inertial measurement. The system includes a deformable coupling pipeline 1, an unmanned trajectory tracer 2, and two monitoring piers 15.

The deformable coupling pipeline 1 is disposed in a landslide mass 19 and at an upper part of a sliding surface. The deformable coupling pipeline 1 may be buried under a shallow surface of the landslide mass 19 by manually excavating a trench, or may be disposed in a deep part of the landslide mass 19 through drilling. In a sliding process of the landslide mass 19, the deformable coupling pipeline 1 needs to slide with the landslide mass 19. Therefore, the deformable coupling pipeline 1 should have low flexural rigidity to avoid uncoordinated pipeline-soil coupling deformation. The deformable coupling pipeline 1 may be a polyvinyl chloride (PVC) wired hose or the like, and the deformable coupling pipeline 1 should be buried at a soft place or another soil region that can be easily excavated.

The unmanned trajectory tracer 2 is disposed in the deformable coupling pipeline 1. The unmanned trajectory tracer 2 is provided with a battery 25, a plurality of motor wheels 5, an inertial sensor 10, and a single chip microcomputer 9 that are electrically connected. The battery 25 supplies power. The motor wheel 5 is configured to make contact with an inner wall of the deformable coupling pipeline 1. Due to force of friction between the motor wheel 5 and the inner wall of the deformable coupling pipeline 1, when the motor wheel 5 is powered on, the single chip microcomputer 9 controls the motor wheel 5 to rotate, to drive the unmanned trajectory tracer 2 to move back and forth in the deformable coupling pipeline 1. In a moving process of the unmanned trajectory tracer 2, the single chip microcomputer 9 controls the inertial sensor 10 to measure a shape of the deformable coupling pipeline 1, to realize a monitoring frequency of the deformable coupling pipeline 1.

The two monitoring piers 15 are securely connected to two ends of the deformable coupling pipeline 1 respectively. The monitoring pier 15 is provided with a GPS device 13 and a communication device. The GPS device 13 is configured to obtain a position, namely, spatial coordinates, of the monitoring pier 15 in real time. The communication device is in communication connection with the single chip microcomputer 9, and the single chip microcomputer 9 obtains the shape of the deformable coupling pipeline 1 and sends it to the communication device. The communication device is configured to upload the shape of the deformable coupling pipeline 1 to a network or a mobile terminal.

Further, the monitoring pier 15 is provided with a solar cell 12, the deformable coupling pipeline 1 is wound with a wireless power transmitting coil 3, the solar cell 12 is electrically connected to the wireless power transmitting coil 3, the unmanned trajectory tracer 2 is wound with a wireless coupling coil 7, the wireless power transmitting coil 3 is wirelessly coupled with the wireless coupling coil 7, and the battery 25 is electrically connected to the wireless coupling coil 7. The solar cell 12 can absorb light energy of solar energy and convert the light energy into electric energy, use the wireless power transmitting coil 3 and the wireless coupling coil 7 to wirelessly transmit the electric energy through electromagnetic induction, and store the electric energy in the battery 25, so that the single chip microcomputer 9, the inertial sensor 10, and the motor wheel 5 can be charged wirelessly. This makes it easy and convenient to perform wiring, and avoids wiring troubles and safety problems caused by wired charging when the unmanned trajectory tracer 2 moves back and forth.

The deformable coupling pipeline 1 is provided with a first NFC terminal 4, the unmanned trajectory tracer 2 is provided with a second NFC terminal 8 that corresponds to the first NFC terminal 4, the first NFC terminal 4 is in communication connection with the second NFC terminal 8, and the first NFC terminal 4 is electrically connected to the communication device. The second NFC terminal 8 and the first NFC terminal 4 can realize NFC for information and transfer monitoring and control information. The second NFC terminal 8 is electrically connected to the single chip microcomputer 9. The wireless coupling coil 7 is electrically connected to the second NFC terminal 8, to wirelessly charge the second NFC terminal 8.

Specifically, the unmanned trajectory tracer 2 includes a hollowed-out cavity 11, and the inertial sensor 10, the single chip microcomputer 9, and the second NFC terminal 8 are secured in the cavity 11. The wireless coupling coil 7 is wound inside the cavity 11 and corresponds to the wireless power transmitting coil 3. The single chip microcomputer 9 controls the second NFC terminal 8 and the inertial sensor 10.

The motor wheel 5 may be directly secured on the unmanned trajectory tracer 2. In this embodiment, the unmanned trajectory tracer 2 further includes two connecting rods 22 and support links 6. The two connecting rods 22 extend along an extension direction of the deformable coupling pipeline 1, and are respectively secured at two ends of the cavity 11. The connecting rods 22 each are connected to a plurality of support links 6. One end of the support link 6 is securely connected to an end portion of the cavity 11, and the other end of the support link is connected to an end, far away from the cavity 11, of the connecting rod 22. The motor wheel 5 is secured on each support link 6. This can improve stability of the unmanned trajectory tracer 2 during movement. Specifically, there are three evenly spaced support links 6, and the unmanned trajectory tracer 2 is in contact with and spaced from the deformable coupling pipeline 1 by using the motor wheel 5. This can reduce force of friction when the unmanned trajectory tracer 2 moves in the deformable coupling pipeline 1, and enhance the stability of the unmanned trajectory tracer 2 during movement.

The other end of the support link 6 is slidably mounted on the connecting rod 22, and a spring 23 is connected between the other end of the support link 6 and the end, far away from the cavity 11, of the connecting rod 22. In this embodiment, the connecting rod 22 is sleeved with a lantern ring 24, the other end of the support link 6 is securely connected to the lantern ring 24, the end, far away from the cavity 11, of the connecting rod 22 protrudes outward to form a ring-shaped protrusion portion 22a, the spring 23 is connected between the lantern ring 24 and the ring-shaped protrusion portion 22a, and the spring 23 is in a compressed state. Because a return action of the spring 23 generates thrust to the support link 6, the motor wheel 5 abuts against the inner wall of the deformable coupling pipeline 1. The other end of the support link 6 can slide on the connecting rod 22, and a distance between the motor wheel 5 and the connecting rod 22 can be adjusted. In this way, the unmanned trajectory tracer 2 can be applied to deformable coupling pipelines 1 with different pipeline diameters.

The monitoring pier 15 may be provided with a control device. The control device is electrically connected to the solar cell 12 to control the solar cell 12 and the wireless power transmitting coil 3 to cooperate with each other to supply power. The control device is electrically connected to the wireless power transmitting coil 3 and the first NFC terminal 4 to control power supply of the wireless power transmitting coil 3 and information collection of the first NFC terminal 4. The communication device and the control device are mounted in a control box 14.

Figure 5:
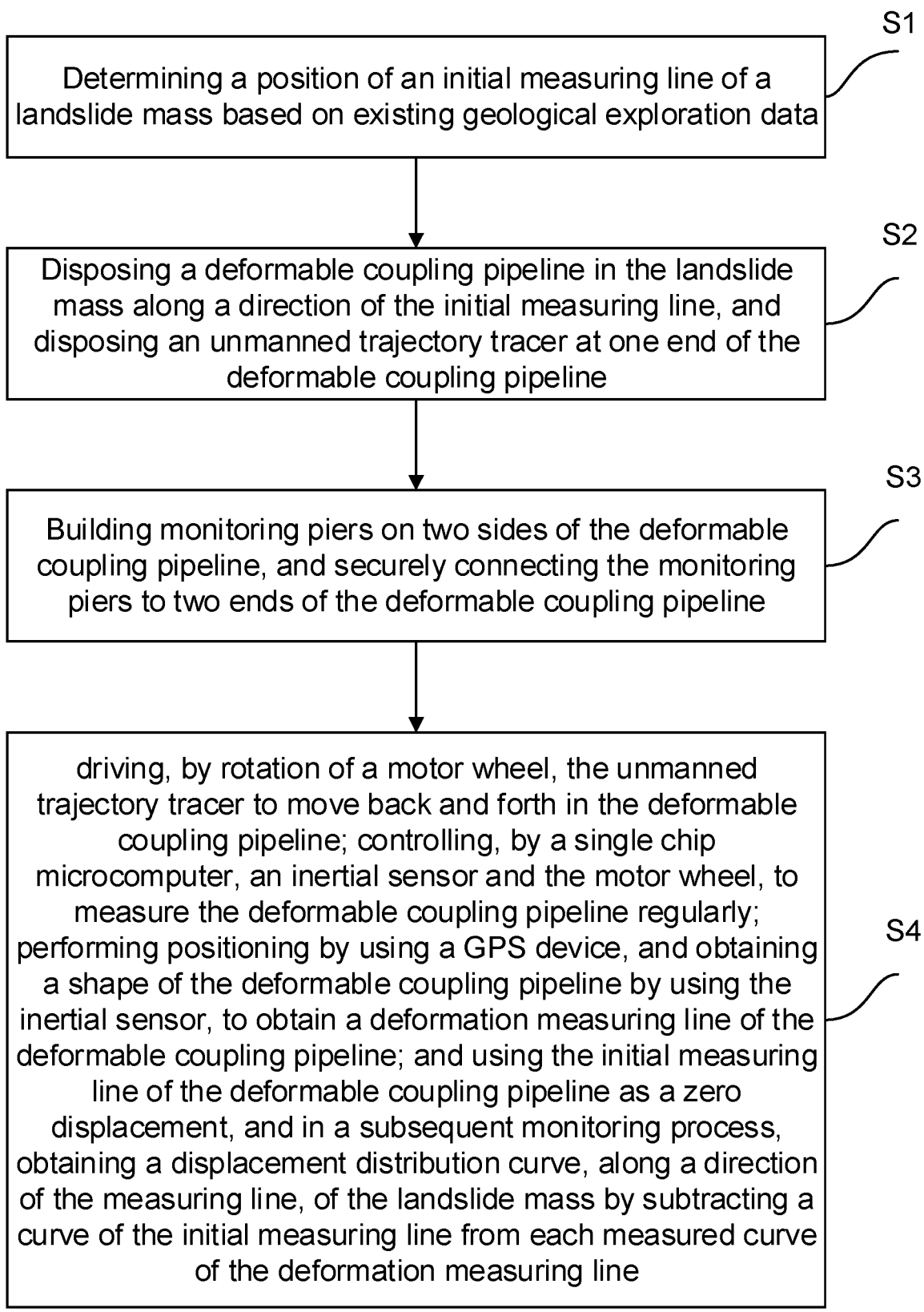
FIG. 5 is a schematic flowchart of an embodiment of a monitoring method according to the present disclosure.

Based on the above unmanned system for monitoring lateral deformation of a landslide based on inertial measurement, an embodiment of the present disclosure further provides a monitoring method. As shown in FIG. 5, the monitoring method includes the following steps.

S1: Determine a position of an initial measuring line 20 of a landslide mass 19 based on existing geological exploration data. The determining an initial measuring line 20 includes a depth, an elevation, and a disposing manner of the landslide mass 19, and needs to comprehensively consider geological and topographical conditions, a deformable coupling form of a pipeline, a purpose and demand of displacement distribution measurement. The initial measuring line 20 needs to be perpendicular to a sliding direction of the landslide mass 19, and is generally located near a front edge of a surface of the landslide mass 19.

S2: Dispose a deformable coupling pipeline 1 in the landslide mass 19 along a direction of the initial measuring line 20. To bury the deformable coupling pipeline 1 under a shallow surface, excavate a trench with a width larger than that of the deformable coupling pipeline 1, spread and place the deformable coupling pipeline 1 in the trench properly, and then cover the deformable coupling pipeline 1 with soil. To bury the deformable coupling pipeline 1 deeply, drill a borehole by using a drilling machine, dispose the deformable coupling pipeline 1 in the borehole, and place an unmanned trajectory tracer 2 at one end of the deformable coupling pipeline 1 after burying the deformable coupling pipeline 1.

S3: Build monitoring piers 15 on two sides of the deformable coupling pipeline 1, and securely connect the monitoring piers 15 to two ends of the deformable coupling pipeline 1. The monitoring pier 15 is made of concrete, and a buried depth of the concrete pier should be enough to prevent the two ends of the deformable coupling pipeline 1 from moving.

S4: Before monitoring, use a wireless power transmitting coil 3 and a wireless coupling coil 7 to transmit, wirelessly through electromagnetic induction, electric energy generated by a solar cell 12 to a battery 25 for storage, so that a single chip microcomputer 9, an inertial sensor 10, and a motor wheel 5 can be charged wirelessly; and use a control device to initialize a monitoring frequency and other information of the unmanned trajectory tracer, and transfer, by using a first NFC terminal 4 and a second NFC terminal 8, the monitoring frequency and other information to the single chip microcomputer 9 for storage.

After the monitoring starts, the battery 25 and the motor wheel 5 are powered on. The motor wheel 5 rotates to drive the unmanned trajectory tracer 2 to move back and forth in the deformable coupling pipeline 1. The single chip microcomputer 9 controls the inertial sensor 10 and the motor wheel 5, to measure the disposed deformable coupling pipeline 1 regularly. Positioning is performed by using a GPS device 13, and a shape of the deformable coupling pipeline 1 is obtained by using the inertial sensor 10, to obtain a deformation measuring line 21 of the deformable coupling pipeline 1. Each measurement needs to be repeatedly performed for a plurality of times to obtain an average value. The initial measuring line 20 of the deformable coupling pipeline 1 is used as a zero displacement. In a subsequent monitoring process, a displacement distribution curve, along a direction of the measuring line, of the landslide mass 19 is obtained by subtracting a curve of the initial measuring line 20 from each measured curve of the deformation measuring line 21. Specifically, the single chip microcomputer 9 controls the motor wheel 5 to drive the unmanned trajectory tracer 2 to move back and forth once in the deformable coupling pipeline 1, and meanwhile, the single chip microcomputer 9 controls the inertial sensor 10 to measure a current shape of the deformable coupling pipeline 1 as the deformation measuring line 21. This is referred to as one monitoring process. Positioning is performed by using the GPS device 13, and the shape of the deformable coupling pipeline 1 is obtained by using the inertial sensor 10. The single chip microcomputer 9 obtains the shape of the deformable coupling pipeline 1 and sends it to the communication device. In this embodiment, the single chip microcomputer 19 transmits information measured by the inertial sensor 10 back to the communication device on the monitoring pier 15 through cooperation between the second NFC terminal 8 and the first NFC terminal 4. The communication device uploads the shape of the deformable coupling pipeline 1 to a network or a mobile terminal, to obtain the deformation measuring line 21 of the deformable coupling pipeline 1.

Figure 2:
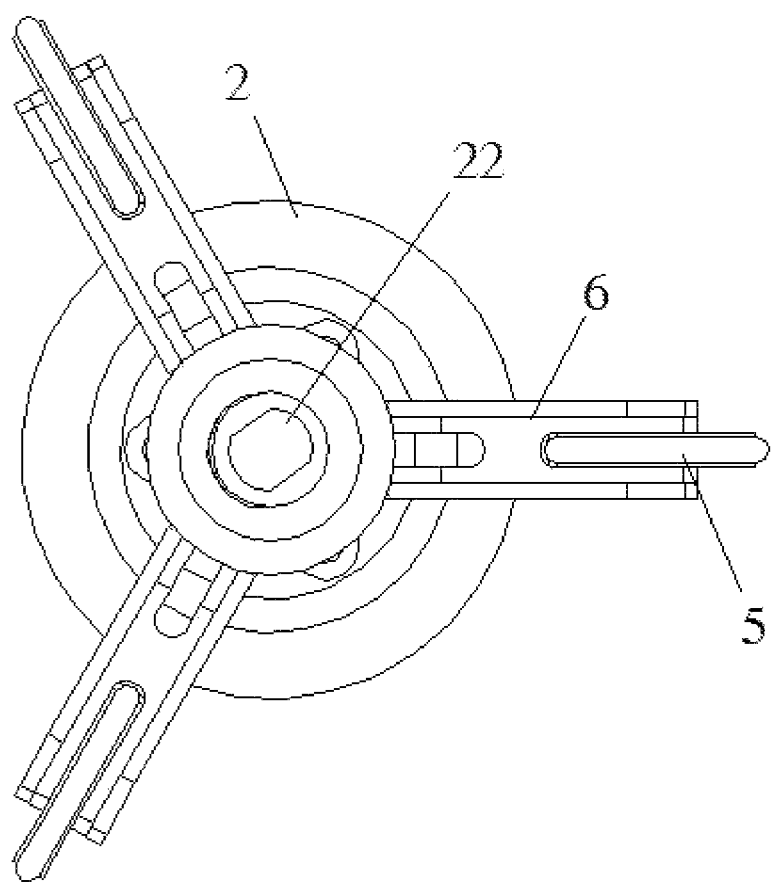
FIG. 2 is a side view of an unmanned trajectory tracer in FIG. 1.
Figure 3:
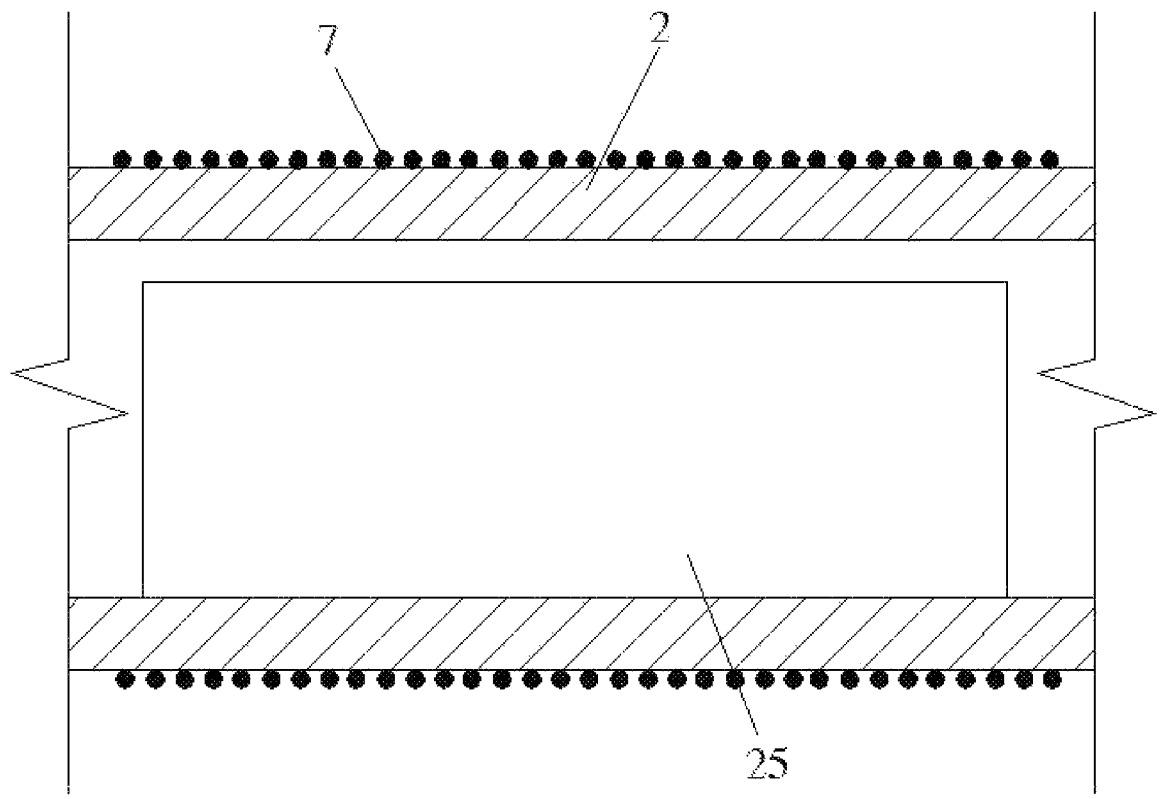
FIG. 3 is a cross-sectional structural diagram of a wireless coupling coil and a battery in FIG. 1.
Figure 4:
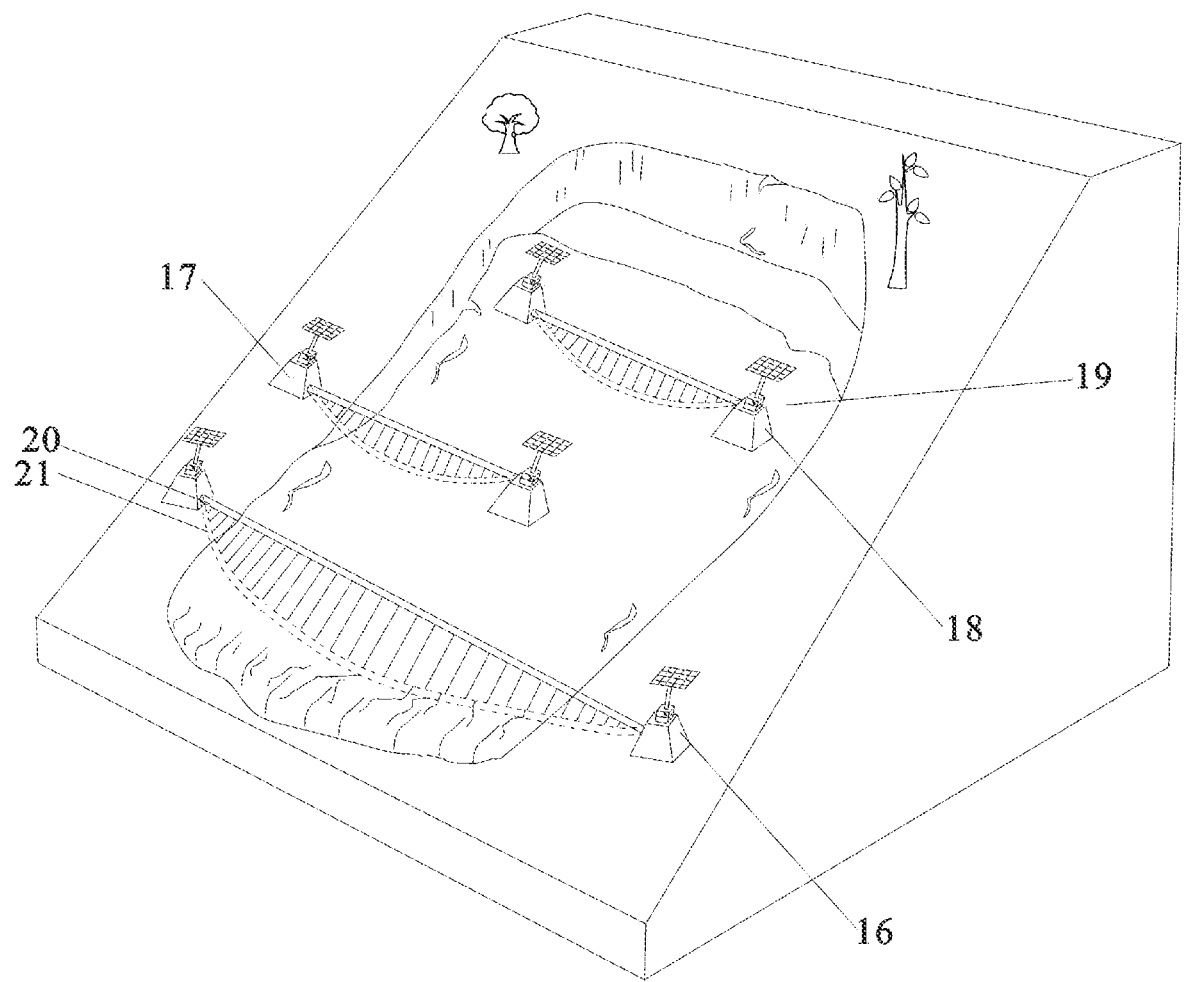
FIG. 4 is a schematic diagram of a method for using the unmanned system for monitoring lateral deformation of a landslide based on inertial measurement in FIG. 1.

Refer to FIG. 2. The deformable coupling pipeline 1 may be disposed in three manners. When two sides of the landslide mass 19 each have a solid ground surface, the deformable coupling pipeline 1 runs through the whole landslide mass 19 along a cross section of the landslide mass 19, the two ends of the deformable coupling pipeline 1 are outside the landslide mass 19, the monitoring piers 15 are secured on the solid ground surface, and positions of the ends of the deformable coupling pipeline 1 are absolutely fixed, and will not change with deformation of the deformable coupling pipeline 1, forming a simply-supported hinge type 16. When the shape of the deformable coupling pipeline 1 is measured in a time-sharing manner to calculate a displacement, an absolute displacement distribution curve, along a direction of the measuring line, of the landslide mass 19 can be calculated only by aligning the positions of the two ends.

When only one side of the landslide mass 19 has a solid ground surface, one end of the deformable coupling pipeline 1 runs through a boundary of the landslide mass 19, and the other end is located at a cantilever type 17 in the landslide mass 19. One monitoring pier 15 is secured on the solid ground surface, and the other monitoring pier 15 is secured on the landslide mass 19. In this way, single-ended (GPS monitoring pier 15) positioning can be performed only through a fixed end point outside the boundary of the landslide mass 19, and positioning precision is slightly worse than that of two-ended positioning in the simply-supported hinge type 16.

When the smaller landslide mass 19 is formed in a landslide mass, the two ends of the deformable coupling pipeline 1 are secured in the landslide mass 19 to form a floating hinge type 18, and the two monitoring piers 15 are secured on the landslide mass 19. In this case, the monitoring rely on only local deformation of the landslide mass 19 and a relative displacement distribution curve based on the positions of the two ends, resulting in a worst monitoring effect of the landslide mass 19.

According to the technical solutions provided in the present disclosure, the system can work at any time any place under any weather condition. It has a mature technology and reasonable design, and can be widely applied. It is applicable to monitoring of surface, underground and even underwater deformation of a landslide. The unmanned trajectory tracer 2 has a high update rate of measurement data, and desired short-term precision and stability. The inertial sensor 10 can provide data of a spatial position, a moving speed and direction, and a spatial posture of a monitored object, and generated measurement information has excellent continuity and low noise. With an unmanned design, the monitoring device is economically advantageous, and can be easily popularized.

The solar cell 12 is used for power collection, storage and supply of the whole system. The solar cell 12 can obtain electric energy through energy saving and environmental protection, and can also wirelessly charge the unmanned trajectory tracer 2.

In this specification, the terms "front", "back", "upper", and "lower" are defined based on positions of the components or parts in the figure and relative positions of the components or parts, to merely express the technical solutions clearly and conveniently. It should be understood that these terms are not used to limit the protection scope of the present disclosure.

The embodiment in the present disclosure and the features in the embodiments may be combined with each other in a non-conflicting situation.

The above-mentioned are merely preferred embodiments of the present disclosure, and are not intended to limit the present disclosure. Any modifications, equivalent replacements and improvements made within the spirit and principle of the present disclosure should be included in the protection scope of the present disclosure.

What is claimed is:

1. An unmanned system for monitoring lateral deformation of a landslide based on inertial measurement, comprising:
   a deformable coupling pipeline, disposed in a landslide mass and at an upper part of a sliding surface;
   an unmanned trajectory tracer, disposed in the deformable coupling pipeline, wherein the unmanned trajectory tracer is provided with a battery, a plurality of motor wheels, an inertial sensor, and a single chip microcomputer that are electrically connected; the plurality of motor wheels is configured to make contact with an inner wall of the deformable coupling pipeline; when the plurality of motor wheels is powered on, the single chip microcomputer controls the plurality of motor wheels to rotate, to drive the unmanned trajectory tracer to move back and forth in the deformable coupling pipeline; and in a moving process of the unmanned trajectory tracer, the single chip microcomputer controls the inertial sensor to measure a shape of the deformable coupling pipeline; and
   two monitoring piers, securely connected to two ends of the deformable coupling pipeline respectively, wherein the monitoring pier is provided with a global positioning system (GPS) device and a communication device, the GPS device is configured to obtain positions of the monitoring piers in real time, the communication device is in communication connection with the single chip microcomputer, the single chip microcomputer obtains the shape of the deformable coupling pipeline and sends to the communication device, and the communication device is configured to upload the shape of the deformable coupling pipeline to a network or a mobile terminal.

2. The unmanned system according to claim 1, wherein the monitoring pier is provided with a solar cell, the deformable coupling pipeline is wound with a wireless power transmitting coil, the solar cell is electrically connected to the wireless power transmitting coil, the unmanned trajectory tracer is wound with a wireless coupling coil, the wireless power transmitting coil is wirelessly coupled with the wireless coupling coil, and the battery is electrically connected to the wireless coupling coil.

3. The unmanned system according to claim 1, wherein the deformable coupling pipeline is provided with a first near field communication (NFC) terminal, the unmanned trajectory tracer is provided with a second NFC terminal, the first NFC terminal is in communication connection with the second NFC terminal, the first NFC terminal is electrically connected to the communication device, and the second NFC terminal is electrically connected to the single chip microcomputer.

4. The unmanned system according to claim 1, wherein the unmanned trajectory tracer comprises a hollowed-out cavity, and the inertial sensor and the single chip microcomputer are secured in the hollowed-out cavity.

5. The unmanned system according to claim 4, wherein the unmanned trajectory tracer further comprises two connecting rods and support links, the two connecting rods extend along an extension direction of the deformable coupling pipeline, and are respectively secured at two ends of the hollowed-out cavity, the two connecting rods each are connected to a plurality of support links, one end of each support link is securely connected to an end portion of the hollowed-out cavity, the other end of the support link is connected to an end, far away from the hollowed-out cavity, of each of the two connecting rods, and the plurality of motor wheels is secured on each support link, respectively.

6. The unmanned system according to claim 5, wherein the other end of the support link is slidably mounted on the two connecting rods, and a spring is connected between the other end of the support link and the end, far away from the hollowed-out cavity, of the two connecting rods.

7. The unmanned system according to claim 1, wherein the two monitoring piers are secured on a solid ground surface.

8. The unmanned system according to claim 1, wherein one monitoring pier is secured on a solid ground surface, and the other monitoring pier is secured on the landslide mass.

9. The unmanned system according to claim 1, wherein the two monitoring piers are secured on the landslide mass.

10. A monitoring method, based on the unmanned system for monitoring lateral deformation of a landslide based on inertial measurement according to claim 1, and comprising the following steps:
   S1: determining a position of an initial measuring line of a landslide mass based on existing geological exploration data;
   S2: disposing a deformable coupling pipeline in the landslide mass along a direction of the initial measuring line, and disposing an unmanned trajectory tracer at one end of the deformable coupling pipeline;
   S3: building monitoring piers on two sides of the deformable coupling pipeline, and securely connecting the monitoring piers to two ends of the deformable coupling pipeline; and
   S4: driving, by rotation of the plurality of motor wheels, the unmanned trajectory tracer to move back and forth in the deformable coupling pipeline; controlling, by a single chip microcomputer, an inertial sensor and the plurality of motor wheels, to measure the deformable coupling pipeline regularly; performing positioning by using the GPS device, and obtaining a shape of the deformable coupling pipeline by using the inertial sensor, to obtain a deformation measuring line of the deformable coupling pipeline; and using the initial measuring line of the deformable coupling pipeline as a zero displacement, and in a subsequent monitoring process, obtaining a displacement distribution curve, along a direction of the measuring line, of the landslide mass by subtracting a curve of the initial measuring line from each measured curve of the deformation measuring line.

* * * * *